(12) United States Patent
Frank et al.

(10) Patent No.: US 7,237,408 B2
(45) Date of Patent: Jul. 3, 2007

(54) FLEXIBLE SURFACE MOLD AND METHOD OF USE

(75) Inventors: Robert G. Frank, Sarver, PA (US);
Michael T. Fecik, Pittsburgh, PA (US);
William B. Zimmerman, Pittsburgh, PA (US)

(73) Assignee: PPG Industries, Ohio, Inc., Cleveland, OH (US)

( * ) Notice: Subject to any disclaimer, the term of this patent is extended or adjusted under 35 U.S.C. 154(b) by 647 days.

(21) Appl. No.: 10/652,143

(22) Filed: Aug. 29, 2003

(65) Prior Publication Data
US 2005/0044896 A1    Mar. 3, 2005

(51) Int. Cl.
*C03B 23/023* (2006.01)

(52) U.S. Cl. ............... 65/291; 65/290; 65/287; 65/289

(58) Field of Classification Search ........... 65/291, 65/287, 290, 106, 107, 273; 425/423, 416, 425/412; 249/155
See application file for complete search history.

(56) References Cited

U.S. PATENT DOCUMENTS

| | | | | |
|---|---|---|---|---|
| 2,239,546 | A * | 4/1941 | Black et al. ............ | 65/106 |
| 3,409,422 | A * | 11/1968 | Gulotta ................ | 65/25.4 |
| 3,527,589 | A | 9/1970 | Ritter, Jr. ............. | 65/289 |
| 4,272,274 | A | 6/1981 | Frank et al. ........... | 65/273 |
| 4,311,509 | A | 1/1982 | Reader et al. .......... | 65/351 |
| 4,526,605 | A | 7/1985 | Frank et al. ........... | 65/273 |
| 4,579,577 | A | 4/1986 | Claassen .............. | 65/273 |
| 4,662,925 | A | 5/1987 | Thimons et al. ........ | 65/104 |
| 4,767,434 | A | 8/1988 | Schwartz .............. | 65/29 |
| 4,773,925 | A * | 9/1988 | Schultz ............... | 65/106 |
| 4,830,650 | A | 5/1989 | Kelly ................. | 65/106 |
| 4,927,443 | A | 5/1990 | Honjo et al. .......... | 65/273 |
| 5,286,271 | A | 2/1994 | Rueter et al. ......... | 65/106 |
| 5,695,538 | A * | 12/1997 | Goolsbay et al. ....... | 65/106 |
| 5,833,729 | A * | 11/1998 | Meunier et al. ........ | 65/106 |
| 5,849,056 | A * | 12/1998 | May et al. ............ | 65/106 |
| 5,858,047 | A | 1/1999 | Frank et al. .......... | 65/104 |
| 6,076,374 | A * | 6/2000 | Lammi ................ | 65/273 |

FOREIGN PATENT DOCUMENTS

EP    0351207    1/1990

* cited by examiner

*Primary Examiner*—Dionne A. Walls
*Assistant Examiner*—Queenie Dehghan
(74) *Attorney, Agent, or Firm*—Andrew C. Siminerio

(57) ABSTRACT

A mold includes a pair of spaced elongated deformable members and spaced elongated flexible strap members between and connected to the deformable members with the axis of the deformable members parallel to one another and transverse to the axis of the strap members. A set of a plurality of donut rolls spaced from one another along the length of the strap members is provided in the space between adjacent strap members to move a heat softened glass sheet over the strap members and below shaped surface of a vacuum mold. The strap members are moved to lift the sheet off the rolls toward and into contact with the shaping surface. The deformable members are deformed as the flexible members bias the sheet against the shaped surface. Vacuum pulled through the shaping surface maintains the sheet against the shaped surface as the strap members move away from the shaped surface.

47 Claims, 7 Drawing Sheets

FLEXIBLE SURFACE MOLD AND METHOD OF USE

BACKGROUND OF THE INVENTION

1. Field of the Invention

This invention relates to method of, and flexible surface mold for, shaping heat softened sheets, and in particular, to method of, and mold having flexible straps and deformable end members for, biasing a heat softened glass sheet against an upper mold having a shaped surface.

2. Technical Considerations

Tempered and annealed shaped glass sheets used as windows in vehicles, such as automobiles, are required to meet stringent optical requirements, e.g. be free of optical defects that would tend to interfere with clear viewing through the window. Any distortion in the members that engage the heat-softened sheet during the shaping process is replicated in the major surface of the sheet and can result in the glass sheet having an optically deficient surface.

Commercial production of shaped glass sheets usually includes heating flat glass sheets to their softening temperature, shaping the heated sheets to the desired curvature, and then cooling the shaped glass sheets in a controlled manner to anneal, heat strengthen or temper the shaped glass sheet. In one glass shaping process, the glass sheets are serially conveyed through a tunnel type furnace to heat the sheets to their heat deformation temperature, and the heat softened sheets are thereafter conveyed into a shaping station where the sheets are positioned between a pair of vertically aligned upper and lower shaping molds. After shaping, the molds separate with the shaped glass sheet remaining engaged against the upper mold by vacuum. In one embodiment, e.g. disclosed in U.S. Pat. No. 4,830,650, a transferring tempering ring having an outline shape slightly inboard of its perimeter conforming to the desired curvature of the glass sheets moves below the upper mold. The vacuum is discontinued, and the glass sheet drops on the ring. The tempering ring conveys the shaped glass sheet through a cooling station to temper the sheet. In another embodiment, e.g. disclosed in U.S. Pat. No. 5,286,271, after the sheet is shaped, the lower mold is moved downward and the upper mold having the sheet held to the shaping surface by vacuum, moves to a transfer station where the shaped sheet is dropped onto contoured conveying rolls that move the sheet through a cooling station.

In the shaping processes discussed above, the heat softened sheet is pressed between a pair of upper and lower molds, each having a shaping surface. The upper mold is typically a full surface vacuum mold, and the lower mold can be a full surface press as disclosed in U.S. Pat. No. 4,662,925, a segmented mold as disclosed in U.S. Pat. No. 4,272,274 or a ring type mold as disclosed in U.S. Pat. No. 4,830,650. A limitation of the full surface lower mold and the segmented mold is that the molds can only be used to shape sheets to have the same contour. When the sheet contour of the upper mold changes, the full surface mold and the lower segmented mold have to be changed. A limitation of the lower ring mold is that the center portion of the sheet is not biased against the shaping surface of the upper mold.

As can be appreciated, it would advantageous to provide a lower shaping mold that engages and biases the center surface portions and outer surface portions of the sheet against the shaping surface of an upper mold and has a sheet engaging surface that is not limited to one shape or contour.

SUMMARY OF THE INVENTION

The invention relates to a flexible biasing surface mold. In a non-limiting embodiment of the invention, the mold includes a platform having a major surface; a first deformable member is mounted on the platform and spaced from the major surface of the platform; a second deformable member is mounted on the platform and spaced from the major surface of the platform and from the first bendable member, and a plurality of flexible strap members are spaced from one another between and connected to the first and second deformable members. The strap members can be connected to the first and second deformable members in any convenient manner, e.g. by a pair of springs, or by nut and bolt assemblies. The deformable members are mounted on the platform by a first pair of space elongated rigid members each having an end portion mounted to the first deformable member and the opposite end portion mounted on the platform, and a second pair of spaced elongated rigid members each having an end portion mounted to the second deformable member and the opposite end portion mounted on the platform. A force applying member is positioned between each of the pair of rigid members. In a non-limiting embodiment of the invention, the force applying members can include a support member mounted between the platform and the first and second deformable members. A first pull rod has an end portion connected to the first deformable member at a location between the first pair of rigid members, and the other end defined as a second end portion of the first pull rod connected to the support member. A second pull rod has an end portion connected to the second deformable member at a location between the second pair of rigid members, and the other end defined as a second end portion of the second pull rod connected to the support member. An elevator arrangement moves the support member toward the major surface of the platform to deflect the first and second deformable members.

Another non-limiting embodiment of a force applying member includes a biasing device, e.g. electrically powered motors, stepper motors, servomotors, fluid operated cylinders, rack and pinion arrangements and crank mechanisms, mounted on the major surface of the platform. A rod has a first end portion connected to the biasing device, and an opposite end portion defined as a second end portion with the second end portion of the rod of the first applying member connected to the first deformable member, and the second end portion of the rod of the second applying member connected to the second deformable member.

In a further non-limiting embodiment of the invention, each of the strap members has a first surface facing the major surface of the platform and an opposite surface defined as a second surface. At least one rotatable wheel is in the space between adjacent strap members, and a shaft between the first surface of the strap members and the major surface of the platform interconnects the wheels. A displacement system moves the wheels and strap members relative to one another from a first position with portions of periphery of the wheels above the second surface of the strap members to a second position with the periphery of the wheels below the second surface of the strap members, e.g. the wheels and strap members both move, or the wheels are stationary and the strap members move, or the wheels move and the strap members are stationary. In the practice of the invention, the shaft and the wheels are a first conveying roll, and the first conveying roll is one of a plurality of spaced conveying rolls. Each of the conveying rolls includes a wheel in the space between adjacent strap members and a wheel on outer side of the outer strap members. A motor operatively connected to the plurality of shafts rotates the shafts to rotate wheels.

In a further non-limiting embodiment, the first and second deformable members are elongated members having a flat major surface and a long axis with the long axis of the first and second deformable members parallel to one another. The plurality of flexible strap members are each elongated members having a flat major surface, e.g. a laminate comprising a spring steel substrate having a plastic, e.g. a high temperature plastic secured to the flat major surface covering at least the flat major surface of the at least one strap member. The long axis of the strap members are parallel to one another and normal to the long axis of the first deformable member.

The invention further relates to a sheet shaping apparatus of the type having a shaping station comprising an upper mold, a lower mold and an elevator arrangement to move the upper mold and the lower mold toward and away from one another, the upper mold includes a downwardly facing shaping or shaped surface. The improvement includes using the above-discussed mold and selected ones or all of the non-limiting embodiments discussed or implied by the discussion of the non-limiting embodiments as the lower shaping mold.

Other components of the shaping apparatus include a heating furnace having a conveyor on one side of the shaping station defined as the upstream side of the shaping station, a cooling furnace having sheet conveying system on the other side of the shaping station defined as the downstream side of the shaping station and a transfer station between the shaping station and the cooling furnace. Other type of heating furnace that can be used include a gas hearth heating furnace. With a gas hearth furnace the plurality of flexible strap members lie in a plane having a slope toward conveying wheels mounted at one side of one of the outer strap members of the plurality strap members.

In additional non-limiting embodiments of the shaping apparatus, the platform of the lower mold has wheels to move the lower mold into and out of the shaping station. In another non-limiting embodiment of the invention, the displacement system is mounted at the shaping station, and the platform and the plurality of spaced conveyor rolls are mounted on a transportation device to (1) move the platform and the plurality of spaced conveyor rolls into the shaping station to position the platform over the displacement system and (2) move the platform and the plurality of conveyor rolls out of the shaping station. In a further non-limiting embodiment of the invention, the platform, the plurality of spaced conveyor rolls and the displacement system are mounted on transportation device to move the platform. The plurality of spaced conveyor rolls and the displacement system are movable into and out of the shaping station.

The invention still further relates to method of shaping a sheet, e.g. a glass sheet including the steps of providing a first mold having a pair of spaced deformable members and a plurality of spaced flexible strap members between the spaced deformable members, each of the strap members having opposed end portions connected to adjacent one of the deformable members with surface of the plurality of strap members providing a sheet supporting surface; providing a sheet on the supporting surface; providing a convex shaping surface over and spaced from the sheet; moving the shaping surface and the first mold relative to one another to move the shaping surface and the sheet into contact with one another, and continuing the practice of the moving step, while deforming the deformable members to move the sheet against the shaping surface.

Non-limiting embodiments of the method include:
(1) the shaping surface is the shaping surface of a vacuum mold and further including the steps of providing a negative pressure in the vacuum mold during the practice of at least one of the following steps: the moving step, the continuing step and the deforming step to bias the sheet against the shaping surface and moving the first mold away from the shaping surface while the vacuum maintains the sheet against the shaping surface;
(2) positioning portions of rotating wheels above the sheet supporting surface;
(3) displacing the sheet along a path through a heating furnace toward the sheet supporting surface onto the portions of the rotating wheels, and
(4) moving the rotating wheels and supporting surface relative to one another to position the sheet on the sheet supporting surface, and
(5) moving the plurality of flexible strap members and the first and second deformable members toward the shaping surface to move the supporting surface into engagement with the sheet.

Additionally, the invention relates to a shaped sheet, e.g. a glass sheet, e.g. an automotive sidelight made according to the above method.

BRIEF DESCRIPTION OF THE DRAWINGS

FIG. 6A is an enlarged view of the cross section of a non-limiting embodiment of a strap member of the flexible surface mold of the invention.

DESCRIPTION OF PREFERRED EMBODIMENTS

Figure 1:
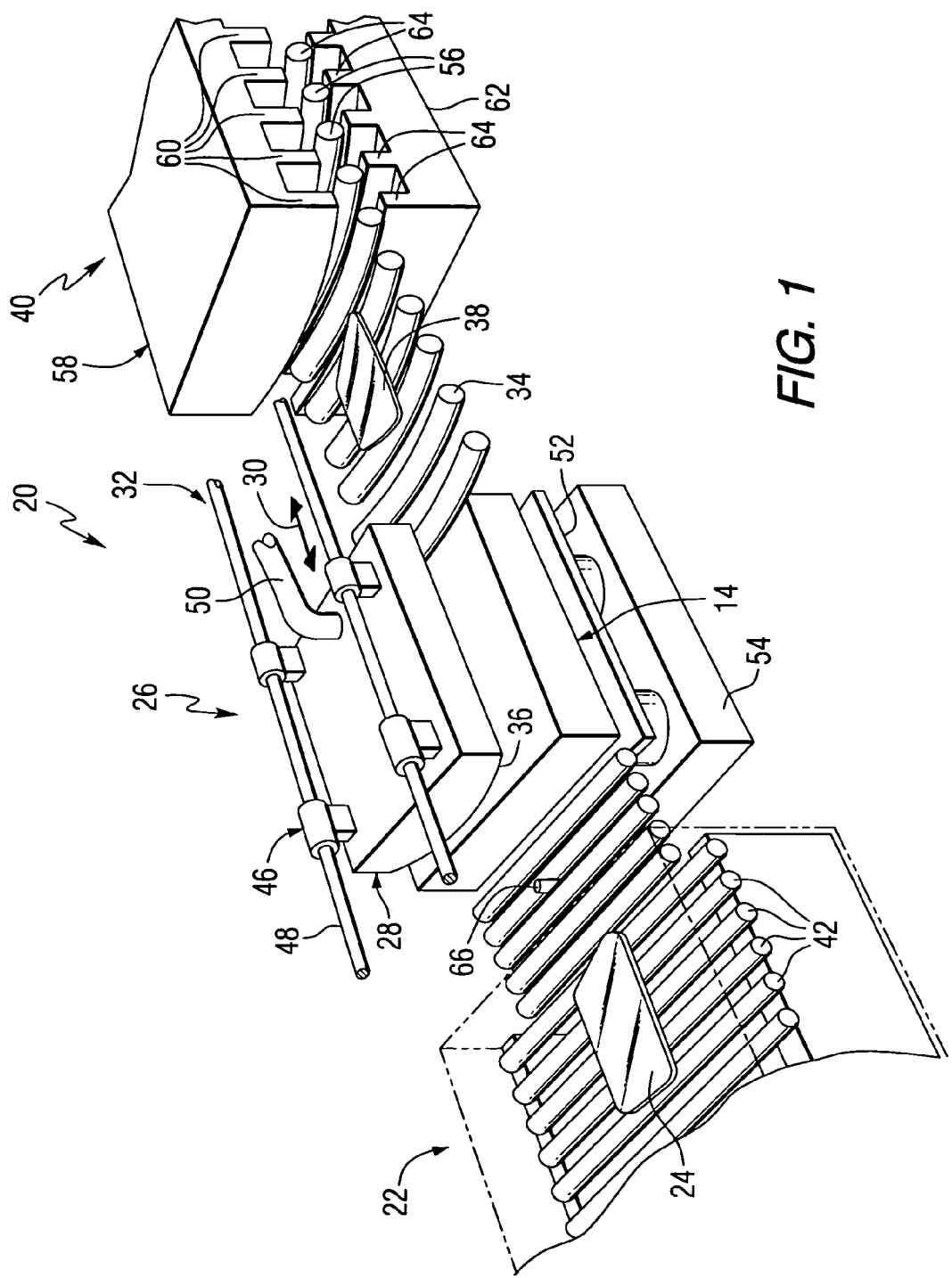
FIG. 1 is a partly fragmented prospective view looking downstream at a glass sheet bending arrangement incorporating non-limiting embodiments of the flexible surface mold (designated by the number 14) of the invention.

In the following discussion of non-limiting embodiments of the invention, the bendable material shaped using the flexible surface mold of, and practicing, the invention is a heat softened glass sheet, however as will be appreciated, the invention is not limited thereto and other materials, for example, but not limiting the invention thereto, plastic, metal, ceramics, glass-ceramics and wood can be used in the practice of the invention. Further, the glass sheet can be a clear glass sheet, a colored glass sheet, a coated glass sheet, e.g. a glass sheet having a functional coating such as a solar control coating, or a heatable coating or combination thereof, e.g. a coated colored glass sheet. Still further in the practice of the invention, the sheet material can be shaped at, above, or below, room temperature. Still further, the shaped glass sheet can be used for a transparency or part of a transparency, e.g. a transparency for land, above water, below water, air and/or space vehicle, e.g. an automotive windshield, and/or side and/or back lights, multiple glazed windows for homes buildings and temperature controlled storage compartments having a viewing area. In addition, the flexible surface mold of the invention can be used alone or in combination with other shaping equipment, e.g. but not limiting to the invention, an upper mold having a shaping surface.

Before discussing the non-limiting embodiments of the flexible surface mold of the invention, it is understood that the invention is not limited in its application to the details of the particular embodiments shown and discussed since the invention is capable of other embodiments. Further the terminology used herein is for the purpose of description and not of limitation.

As used herein, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.2, 3.1 to 7.8 and 5.5 to 10. Also, as used herein, the terms "deposited over", "applied over", or "provided over" mean deposited, applied, or provided on but not necessarily in surface contact with. For example, a material "deposited over" a substrate does not preclude the presence of one or more other materials of the same or different composition located between the deposited material and the substrate.

In the following discussion, unless indicated otherwise, like numbers refer to like elements.

Figure 2:
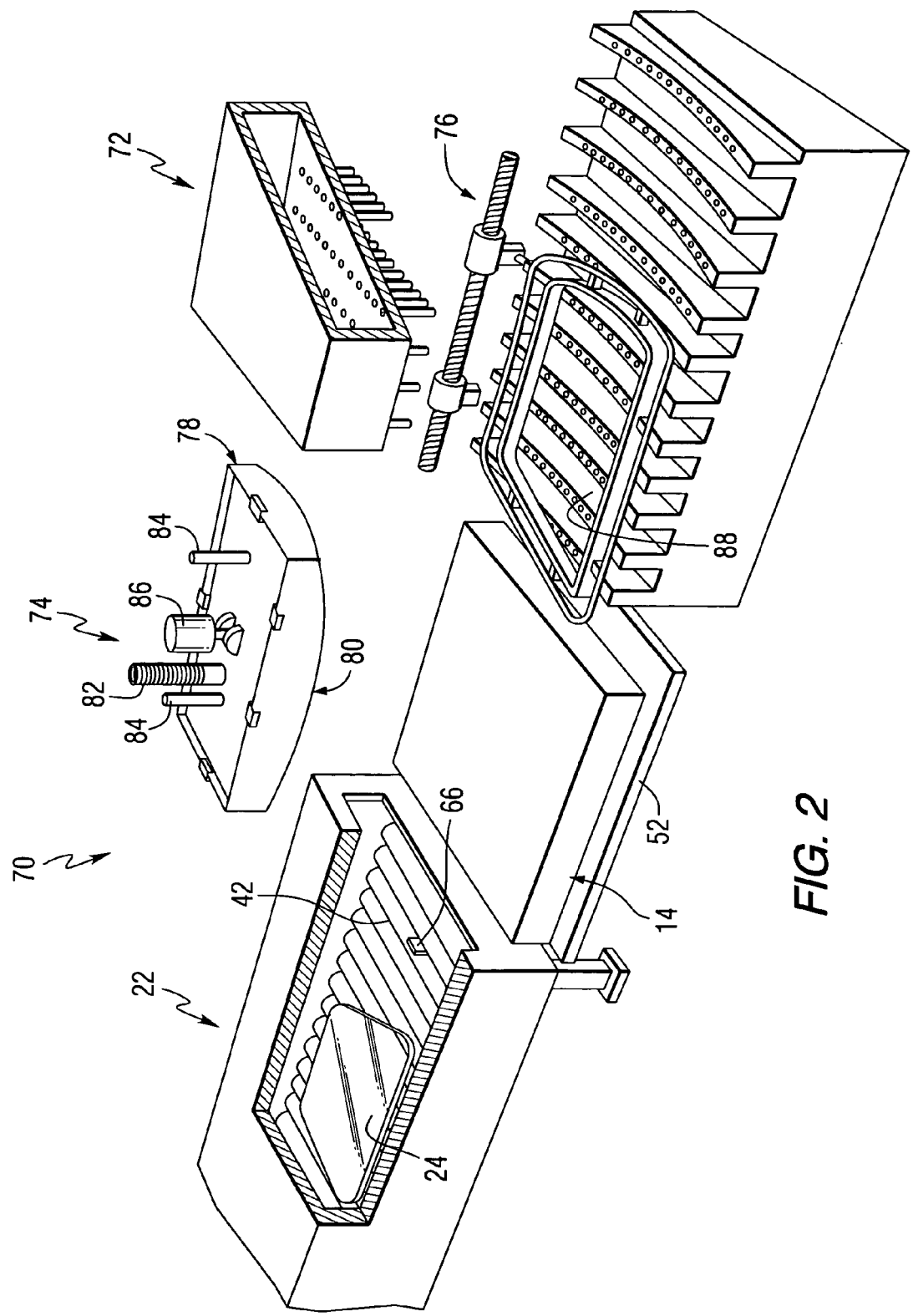
FIG. 2 is a partly fragmented prospective view looking upstream at another glass sheet bending arrangement incorporating non-limiting embodiments of the flexible surface mold (designated by the number 14) of the invention.

With reference to FIGS. 1 and 2, there is shown equipment for shaping glass sheets, e.g. automotive side lights or backlites that can use the flexible surface mold of the invention. The equipment for shaping glass sheets shown in FIGS. 1 and 2 are not limiting to the invention and are used to illustrate types of glass shaping equipment that can be used in the practice of the invention. As can be appreciated, the flexible surface mold of the invention is not limited by the shaping equipment that is used with the flexible mold of the invention. FIG. 1 herein is similar to FIG. 1 of U.S. Pat. No. 5,286,271, and FIG. 2 herein is similar to FIG. 1 of U.S. Pat. No. 4,830,650, with the exception that the flexible surface mold of the invention is incorporated in the equipment. The flexible surface mold of the invention is shown in general outline in FIGS. 1 and 2, and is designated by the number 14. Detailed non-limiting embodiments of the flexible surface mold of the invention are shown in other figures of the drawing, are designated by different numbers and are discussed in detail below. U.S. Pat. Nos. 4,830,650 and 5,286,271 in their entirety are hereby incorporated by reference.

With reference to FIG. 1, there is shown apparatus 20 which is discussed in detail in U.S. Pat. No. 5,286,271 except for the mold 14 incorporating features of the present invention for shaping and treating heat softenable materials, e.g. glass sheets. In general, the apparatus 20 includes a tunnel-type furnace 22 through which a series of glass sheets 24 is conveyed from a loading station (not shown) at the upstream end of the furnace 22 along a generally horizontal path to a shaping station 26 where the glass sheet 24 is pressed against an upper vacuum mold 28 by the flexible surface mold 14. The upper mold 28 mounted for reciprocal movement along path 30 holds the glass sheet 24 by vacuum, as discussed in U.S. Pat. No. 5,286,271, and shuttles along the path 30 in a first direction (to the right as viewed in FIG. 1) to a position which is a short vertical distance above a downstream transfer station 32.

The transfer station 32 includes a series of transversely shaped conveyor rolls 34 having a transverse elevational curvature that corresponds to a transverse curvature of a downwardly facing shaping or shaped surface 36 of the upper vacuum mold 28. A shaped glass sheet 38 is deposited onto the rolls 34 which in turn maintain the shape of the glass sheet as it is conveyed to and through a cooling station 40, which controllably cools the shaped glass sheet 38. The rolls 34 can be of any well-known type, such as segmented rolls of the type shown and discussed in U.S. Pat. No. 4,311,509, which patent is hereby incorporated by reference.

With continued reference to FIG. 1, the furnace 22 includes a horizontal conveyor with longitudinally spaced, transversely extending, cylindrical conveyor rolls 42 that define a path of travel, which extends through the furnace 22. The conveyor rolls 42 can be of the type known for use in the art, e.g. as shown and discussed in U.S. Pat. No. 3,527,589, which patent is hereby incorporated by reference and can be arranged in sections with their rotational speed electronically adjusted in a manner well know in the art so that the speed of each conveyor section can be controlled and synchronized. As an alternative to using the conveyor rolls 42, the conveying surface within furnace 22 may be a gas hearth or a belt conveyor as is known in the art.

The shaping station 26 includes non-limiting embodiments of the flexible surface mold, generally designated by the number 14. As mentioned above, details of non-limiting embodiments of the flexible mold 14 of the present invention are shown in other figures of the drawing and are discussed in detail below. A glass sheet 24 enters the shaping station 26 and moves onto the flexible surface mold 14 in a manner discussed below to a position below the upper vacuum shaping mold 28. If desired, the shaping station 26 can be enclosed and heated. The upper vacuum mold 28 is not limiting to the invention and can be composed of a rigid material such as ceramic, cast iron, brass or steel or can be a flexible or adjustable top press, and covered with a heat resistant cover such as stainless steel or fiberglass fabric. In addition, the upper mold 28 can include a shaping surface cooling arrangement (not shown) to cool the shaped glass sheet 24 while held there against. This would be particularly useful in the process of making shaped glass sheets for windshields, where the process includes annealing the sheets after shaping.

Although not limiting to the invention, the shaping surface 36 of the upper mold 28 that faces downward as viewed in FIG. 1 can be shaped to conform throughout its extent with the shape desired for the glass sheets to be shaped. The upper vacuum mold 28 is horizontally movable along the reciprocating path 30 to and from the transfer station 32 by a shuttling arrangement 46, which can be similar to that disclosed in U.S. Pat. Nos. 4,662,925 and 4,767,434. U.S. Pat. Nos. 4,662,925 and 4,767,434 are hereby incorporated by reference. A drive (not shown) moves the vacuum mold 28 along guide rails 48 between the shaping station 26 and the transfer station 32 along the reciprocating path 30. The vacuum mold 28 further includes an evacuation pipe 50 connected through a suitable valve arrangement (not shown) to a vacuum source (not shown). The vacuum mold 28 can also be provided with a pressurized air source, which provides a positive pressure along surface 36 to help separate the heat softened glass sheet from the vacuum mold 28 when the vacuum is released. The valves for the vacuum and pressurized air lines can be synchronized according to a predetermined time cycle in any convenient manner well known in the glass sheet bending art.

The flexible surface mold 14 incorporating features of the invention is supported on a mounting platform 52 of an elevator system or arrangement 54 in a manner to be discussed below to vertically reciprocate the mold 14 from a first or sheet receiving position, with the mold 14 positioned to receive a heated glass sheet 24 from the furnace 22, to a second or work position where the mold 14 and the upper vacuum mold 28 are moved relative to one another for the flexible surface mold 14 to bias the heat softened sheet 24 against the shaping surface 36 of the upper vacuum mold 28 to shape the glass sheet. After the sheet 24 is shaped, the flexible mold 14 is retracted or moved toward the sheet receiving position and the upper vacuum mold 28 is moved to the transfer station 32 and deposits the shaped sheet 38 at the transfer station 32.

The shaped glass sheet 38 moves on the rolls 34 from the transfer station 32 to and through the cooling station 40 to an unloading station (not shown). As an alternative to using curved rolls, the conveying surface within the transfer station 32 can be a gas hearth, a belt conveyor, or other conveying roll configuration as are known in the art.

The cooling station 40 includes a plurality of curved rolls 56, an upper plenum 58 which supplies cooling fluid under pressure in a downward direction through upper nozzle housings 60 and a lower plenum 62 which supplies cooling fluid under pressure upwardly through lower nozzle housings 64. The housings 60 and 64 have complementary curved opposing surfaces conforming to the transversely curved contour of shaped conveyor rolls 56 and are positioned in offset relation between adjacent conveyor rolls 56 to cool the shaped glass sheets 38 at a rate sufficient to temper of impart a desired degree of heat strengthening to the shaped sheet 38.

In the operation of the apparatus 20 shown in FIG. 1, as each glass sheet 24 in turn is conveyed through the furnace 22, it is heated to the glass softening temperature while supported across its entire width on the successive cylindrical rolls 42. A sensor 66, which can be positioned at the exit end of the furnace 22 or within the furnace 22, senses the position of a leading glass sheet 24 in the series, and in particular its leading or trailing edge, and forwards the information to a controller (not shown) which controls the conveying rates of rolls 42 in the furnace 22 and the rate of movement of the glass sheet 24 into the shaping station 26, e.g. at a constant normal speed on the order of 400 to 450 inches (10.2 to 11.4 m) per minute. When the glass sheet 24 is in the proper position between the upper vacuum mold 28 and the lower flexible full surface mold 14 of the invention, the elevator system 54 is energized to move the flexible mold 14 upward, to lift or bias the glass sheet 24 against the shaping surface 36 of the upper vacuum mold 28 in a manner discussed below.

After the sheet 24 is biased against the shaping surface 36 of the upper vacuum mold 28, the elevator system 54 is energized to move the flexible mold 14 downward as viewed in FIG. 1, and the shaped glass sheet 38 is held against the shaping surface 36 of the upper mold 28 by vacuum. The shuttle arrangement 46 is actuated to move the upper vacuum mold 28 downstream from the shaping station 26 along the path 30 to the transfer station 32. On arrival at the transfer station 32, the vacuum to the upper mold 28 is discontinued to release the shaped glass sheet 38 a short vertical distance directly onto the transversely curved conveyor rolls 34, which are rotating at the time of transfer. Once unloaded, the upper vacuum mold 28 stops its downstream motion along the path 30 and moves in the opposite direction or upstream direction along the path 30, i.e. to the left as viewed in FIG. 1 and returns to the shaping station 26 in position to await the arrival of the next glass sheet 24.

With reference to FIG. 2, there is shown apparatus 70 for shaping and treating glass sheets which is discussed in detail in U.S. Pat. No. 4,830,650 except for the mold 14 incorporating features of the invention and shown in general outline. In general, the apparatus 70 includes the furnace 22, a station 72 for cooling the shaped glass sheets, an intermediate or shaping station 74 between the furnace 22 and the cooling station 72, and a sheet transfer arrangement 76 located at the cooling station 72. The sheet transfer arrangement transfers the shaped glass sheets through the cooling station 72 to an unloading station (not shown). The glass sheets moved through the cooling station are heat-treated, e.g. the shaped glass sheets are tempered.

The shaping station 74 includes the flexible surface mold 14 (non-limiting embodiments of the flexible surface mold of the present invention discussed below) positioned below the upper vacuum shaping mold 78. In a manner similar to that discussed for the apparatus 20 of FIG. 1, a heated glass sheet 24 moves along a horizontal path from the furnace 22 to the shaping station 74 where the flexible mold biases the sheet 24 against shaping or shaped surface 80 of the upper vacuum shaping mold 78 in a manner discussed. Although not limited in the present invention, upper mold 78 is similar to the upper mold detailed in U.S. Pat. No. 4,579,577, which patent is hereby incorporated by reference. The surface 80 of the upper vacuum mold 78 is shaped to conform to the shape desired for the glass sheet 24 to be shaped. The upper vacuum mold 78 communicates with a vacuum source (not shown) through an evacuation pipe 82 and suitable valve arrangements (not shown). Upper vertical guide rods 84 are suitably connected to a support frame (not shown), and to the upper mold 78 such that the mold 78 is vertically moveable relative to the flexible surface mold 14 by a piston arrangement 86. The evacuation pipe 82 can be connected through a suitable valve arrangement to a source of pressurized air (not shown). The valve for the vacuum line and for the pressure line can be synchronized according to a predetermined time cycle in any convenient manner.

In operation, a glass sheet 24 is conveyed through the furnace 22 to heat the sheet 24 to its heat softening temperature. The sensor 66 senses the position of the glass sheet 24 and sends this information to a controller (not shown) which controls the conveying rates of rolls 42 in furnace 22, and the speed of the sheet 24 as it moves into the shaping station 74. The glass sheet 24 exits the furnace 22 and is conveyed onto the flexible surface mold 14 in the shaping station 74. The mold 14 is in the initial position or sheet receiving position to be discussed below so that the glass 24 is positioned on the mold 14 below the shaping surface 80 of the upper shaping mold 78. When the glass sheet 24 is in proper position between the upper mold 26 and the flexible mold 14, the mold 14 moves upward lifting the glass sheet 24 against the shaping surface 80 of the upper mold 78 to conform the glass sheet 24 to the corresponding shape of the surface 80 of the upper vacuum mold 78.

After shaping, the flexible surface mold 14 is lowered toward its sheet receiving position, and the shaped glass sheet is held against the shaping surface 80 of the upper mold 78 by vacuum. The sheet transfer arrangement 76 moves a sheet-receiving device 88, such as a temper ring, beneath the shaping surface 80 of the upper vacuum mold 78. The vacuum is then discontinued and the shaped glass sheet is deposited onto and is supported by the tempering ring 88. The upper mold 78 moves upwardly away from the tempering ring 88, and the sheet transfer arrangement 76 moves the tempering ring 88 having the shaped glass sheet through the shaping station 72 where the shaped sheet is controllably cooled to temper the shaped glass sheet.

The discussion will now be directed to non-limiting embodiments of the flexible surface mold 14 having features of the present invention.

Figures 3, 3A:
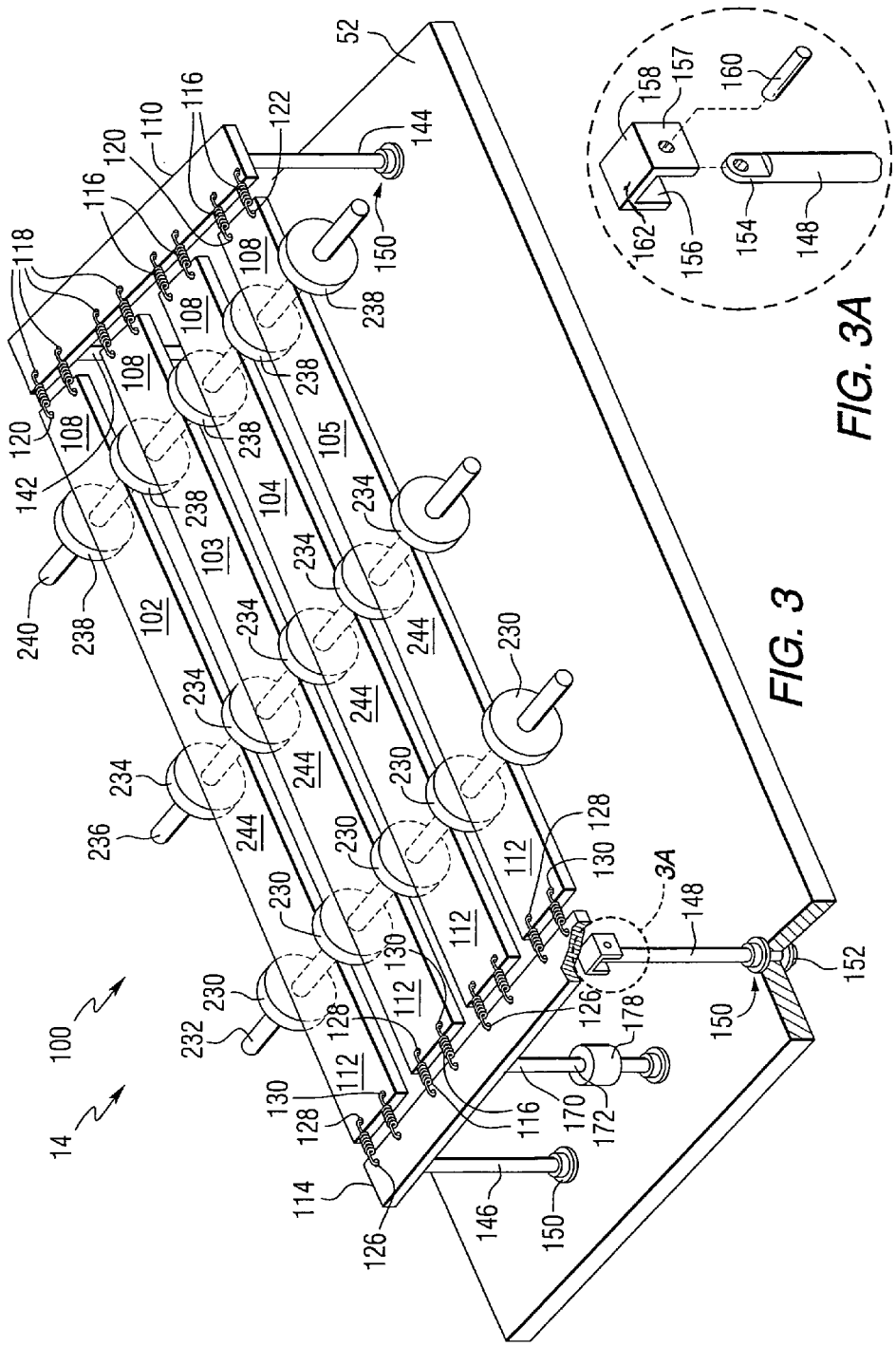
FIG. 3 is an orthogonal view having portions removed for purposed of clarity of a non-limiting embodiment of a flexible surface mold of the invention.
FIG. 3A is an enlarged view of a non-limiting connection between end portion of a mounting rod and a side member of the flexible surface mold of FIG. 3.

A non-limiting embodiment of the flexible surface mold 14 of the invention is shown in FIG. 3 and identified by the number 100. The flexible mold 100 includes a plurality of spaced flexible elongated straps or members 102–105 for biasing a sheet against the shaping surface of a mold, e.g. the shaping surface of the upper mold 28 of FIG. 1 and/or 78 of FIG. 2. The elongated members 102–105 are each joined at one end 108 to elongated deformable side member 110, and at their opposite end 112 to elongated deformable side member 114. In the non-limiting embodiment shown in FIG. 3, the long axis of the side members 110 and 114 lie in the same direction and are transverse to the long axis of the members 102–105. End portions 108 and 112 of the members 102–105 are joined to the side members 110 and 114, respectively in any usual manner. In the non-limiting embodiment shown in FIG. 3, although not limiting to the invention, springs 116 secure the members 102–5 to the members 110 and 114. In the following discussion, the attachment of the member 102 to the members 110 and 114 will be discussed, and unless indicated otherwise, the members 103-105 are attached to the members 110 and 114 in a similar manner. Not limiting to the invention, the member 110 is provided with a plurality of holes 118. One end of a spring 116 is attached to one of the holes 118 in the member 110, and the other end of the spring 116 is attached to hole 120 in the end portion 108 of the member 102. One end of another spring 116 is attached to adjacent hole 118 in the side member 110, and the other end of the spring 116 is attached to hole 122 in the end portion 108 of the member 102. Similarly, a spring 116 has one end attached to one of a plurality of holes 126 in the side member 114 with the other end of the spring 116 attached to hole 128 in the end portion 112 of the member 102. One end of another spring 116 has one end attached to adjacent one of the holes 126 in the side member 114, and the other end of the spring 116 attached to hole 130 in the end potion 112 of the member 102. As can be appreciated the invention is not limited to the number of springs attaching or securing the ends of the members 102–105 to the side members 110 and 114; however, when using only one spring care has to be exercised to prevent rotation of the members 102–105 relative to one another and to the side members 110 and 114.

Figure 4:
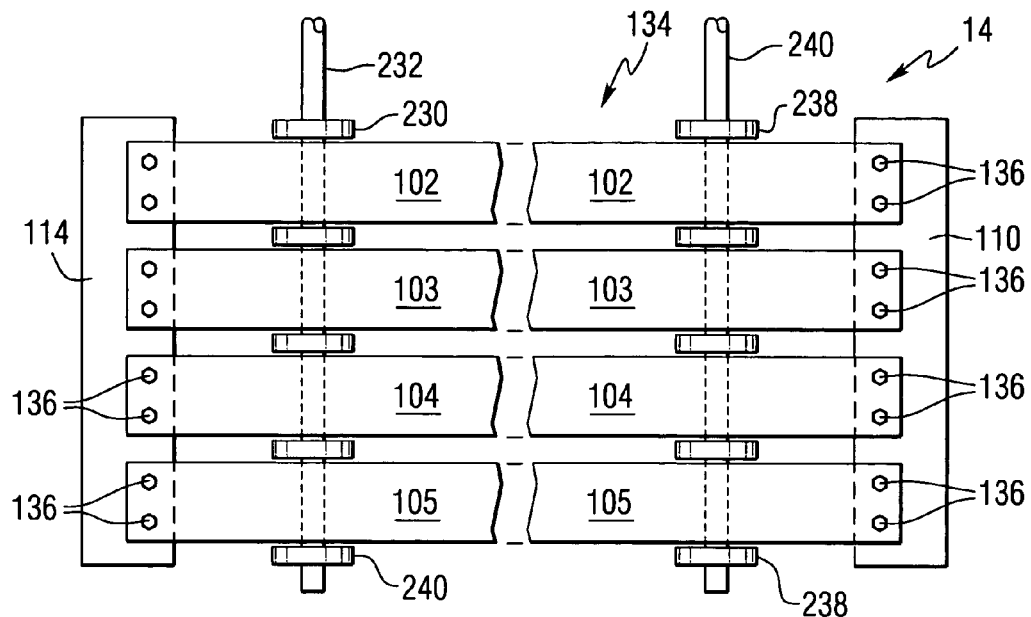
FIG. 4 is segmented plan view of another non-limiting embodiment of a flexible surface mold of the invention.

With reference to FIG. 4 there is shown another non-limiting embodiment of the invention. The non-limiting embodiment of the flexible surface mold 14 of the invention designated in FIG. 4 by the number 134. The elongated members 102–105 of the mold 134 are secured at one end to the elongated side member 110 and at the other end to the elongated side member 114 by screw and bolt arrangements 136. The flexible surface mold 134 shown in FIG. 4 is preferably used with shaping apparatus having the surface mold generally lying in the plane of the movement path (see FIG. 11) and/or when the distance of the surface of the mold 134 below the sheet movement path would position the springs 116 in the plane of the glass movement path.

Figure 5:
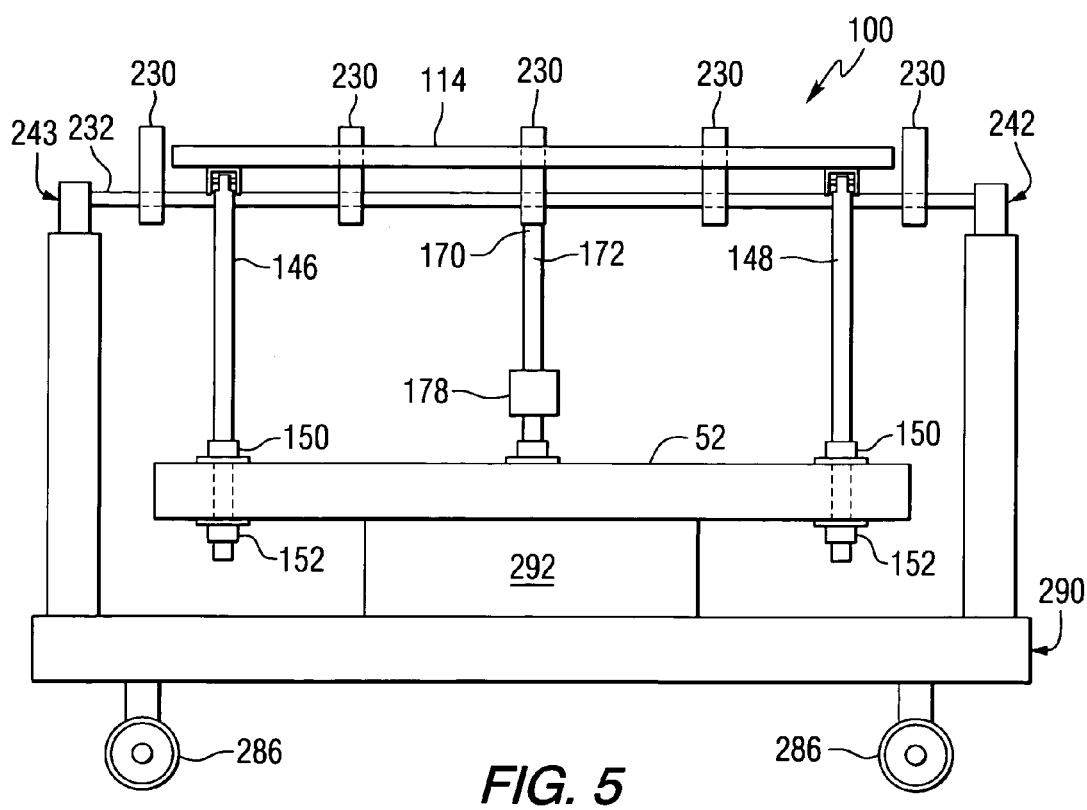
FIG. 5 is an end view of the flexible mold shown in FIG. 3 mounted on a cart in accordance to the invention.

Referring back to FIG. 3, the members 102–105 and 110 and 114 are positioned above the mounting platform 52 in any convenient manner. More particularly and with reference to FIGS. 3, 3A and 5 as needed, a pair of spaced mounting rods 142 and 144 each have one end mounted to the member 110 to support the member 110 with the other end of the rods 142 and 144 secured to the mounting platform 52 in any convenient manner. Another pair of spaced mounting rods 146 and 148 each has one end mounted to the member 114 with the other end of the rods 146 and 148 secured to the mounting platform 52 in any convenient manner. In one non-limiting embodiment of the invention, the mounting rods 142, 144, 146 and 148 are elongated rods having one end pivotally mounted to bottom surface of their respective side member 110 and 114 in any convenient member and pass through the platform 52 (clearly shown in FIG. 5). The lower ends of the rods 144, 144, 146 and 148 as viewed in FIG. 5 are secured in a fixed spaced relationship to one another by capturing the end of the mounting rods 142, 144, 146 and 148 on the platform 52 by upper and lower washer and bolt assemblies 150 and 152, respectively (shown only for the rod 148 in FIG. 3).

The discussion will now be directed to mounting the upper end portion of the mounting rods 142, 144, 146 and 148 as viewed in FIG. 3 to their respective side members 110 and 114. The discussion, although not limiting to the invention, will be directed to the mounting rod 148 with the understanding that the discussion is applicable to the other mounting rods 142, 144 and 146 unless indicted otherwise. Upper end portion 152 of the rod 148 is pivotally mounted between spaced legs 156 and 157 of a U-shaped member 158 by a pin 160 passing through the legs 156 and 157 and the end portion of the mounting rod 148 (clearly shown in FIG. 3A). The U-shaped member 158 has its base 162 secured to adjacent end portion, e.g. right end portion as viewed in FIG. 3 of the side member 114 in any usual manner. The U-shaped member 158 is preferably mounted on the underside of the side member 114 as viewed in FIG. 3 with the longitudinal axis of the pin 160 transverse, e.g. perpendicular to the longitudinal axis of the side member 114. In this manner, the members 110 and 114 pivot about the end of their respective mounting rods 142 and 144, and 146 and 148, respectively when the center portion of the members 110 and 114 is downwardly and upwardly deflected as viewed in FIG. 3.

As can be appreciated, the upper end of the mounting rods can be secured to their respective side member 110 and 114 in any usual manner, e.g. using the washer and bolt arrangement 150 and 152 discussed above for capturing the mounting rods on the platform 52.

The center portion of the members 110 and 114 can be deflected in any usual manner to change the outline or shape defined by the members 102–105, 110 and 114. In the following discussion of a non-limiting embodiment of the invention to deflect the side members 110 and 114, the discussion will be directed to a mechanism to deflect the side member 114 with the understanding that the discussion unless indicated otherwise is applicable to deflecting the side member 110. With reference to FIGS. 3 and 5, upper end portion 170 of pull rod 172 as viewed in FIGS. 3 and 5 is secured to center portion of the member 114 in any usual manner, e.g. using an inverted U-shaped member and pin arrangement as was discussed for pivotally mounting the end portion of the mounting rods 142, 144, 146 and 148 to their respective side members 110 and 114, or the washer and bolt arrangement 150 and 152 used to capture the end of the mounting rods on the platform 52. The other end of the pull rod is connected to a stepper motor 178 secured to the platform 52 in any convenient manner. In the following discussion the elevator mechanism is a stepper motor, however as can be appreciated the invention is not limited thereto.

Figure 6:
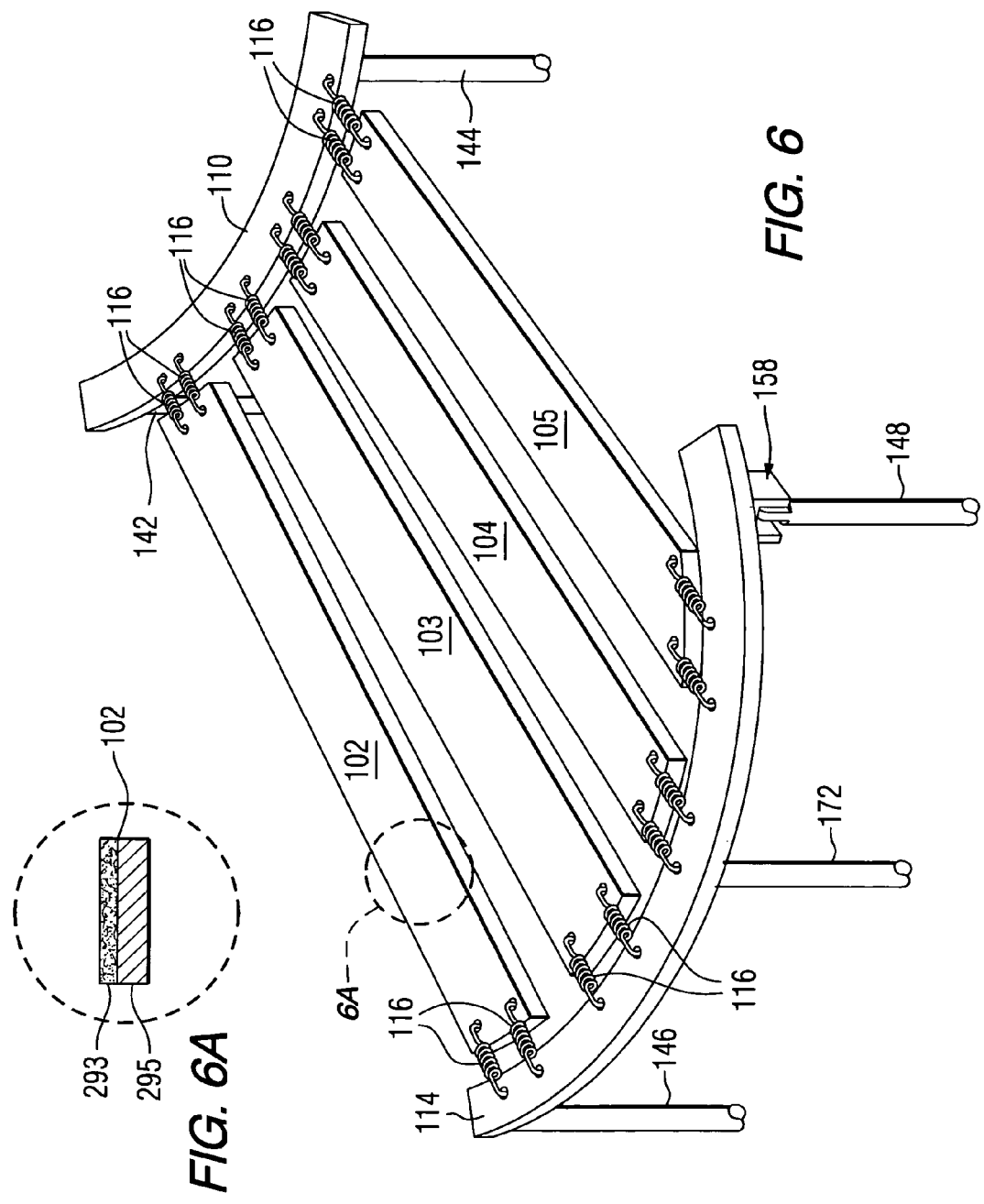
FIG. 6 is an orthogonal view of the flexible surface mold shown in FIG. 3 having portions removed for purposes of clarity, illustrating the flexible mold in the sheet bending position.

The stepper motor 178 is secured to the platform 52 as shown in FIGS. 3 and 5 in any convenient manner. When the stepper motor 178 is in an initial position, the pull rod 172 is extended upward as viewed in FIG. 5 to set the members 102–105, 110 and 114 in the first position or sheet receiving position. After the sheet 24 is supported on the members 102–105 of the flexible mold 100 below the shaping surface of an upper mold 28 of FIG. 1 and/or upper mold 80 of FIG. 2 in a manner to be discussed below, the platform 52 is moved toward the upper mold. The stepper motor moves through the first cycle to displace the pull rod 172 and deflect the respective members 110 and 114 downward as viewed in FIGS. 3 and 5 to flexible the mold 100 into the sheet shaping position as shown in FIG. 6. The platform 52 continues to move upward as viewed in FIGS. 1 and 2 to bias the sheet 24 against the shaping surface of the upper molds 28 or 80. After the sheet is transferred to the upper mold, the platform 52 moves downward as viewed in FIGS. 1 and 2 toward its initial position and the stepping motor moves to complete a cycle during which time the pull rod 172 is moved upward as viewed in FIG. 5 to move the flexible mold 100, e.g. members 102–105, 110 and 114 to the initial or sheet receiving position.

As can now be appreciated, the members 102–105, 110 and 114 in the initial or sheet receiving do not have to be flat, e.g. lie in a plane to receive a heated sheet 24 as it exits the furnace 22 shown in FIG. 1. For example, when a sheet exiting the furnace and moving into the shaping station has a curvature, the mold 100 in the shaping station in the sheet receiving position would have the members 110 and 114 deflected as shown in FIG. 6. In this instance the side members 110 and 114 can be further deflected to position the members 102–105, 110 and 114 in the second position, or no further deflection of the side members is made in which case there is no second position.

Figure 7:
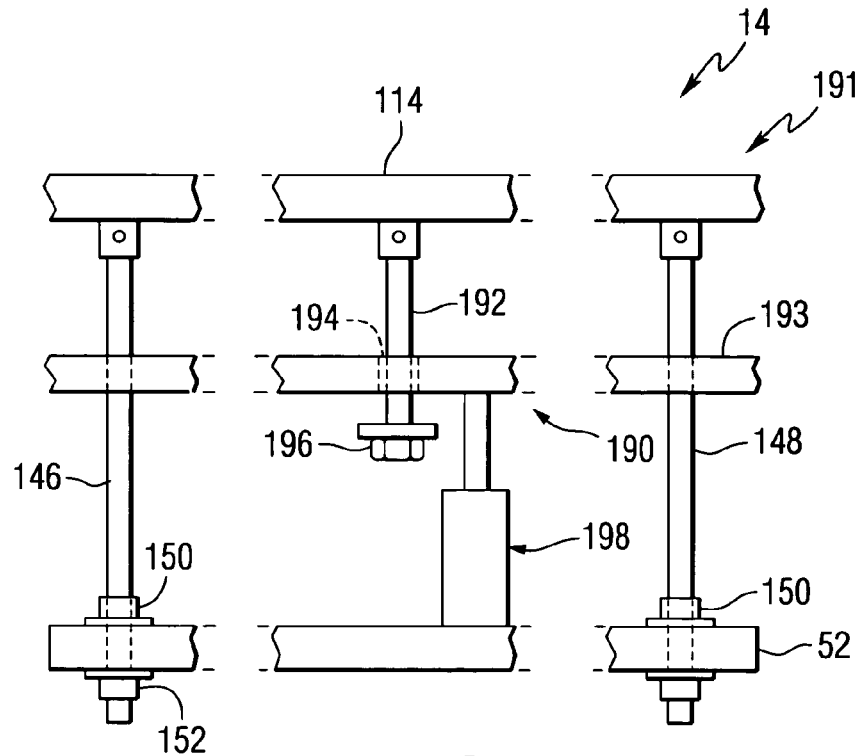
FIG. 7 is a fragmented end view of a non-limiting embodiment of a flexible surface mold incorporating features of the invention illustrating a non-limiting mechanical arrangement to deflect the side members of the flexible mold.

As can be appreciated, the invention is not limited to the elevator arrangement to deflect the center potion of the members 110 and 114 to configure the members 102–105, 110 and 114. Shown in FIG. 7 is a non-limiting elevator arrangement 190 that can be used with any embodiments of the flexible mold 14 of the invention, e.g. the mold 100 shown in FIG. 3 and the mold 134 shown in FIG. 4. For clarity of discussion, the non-limiting embodiment of the flexible mold 14 of the invention shown in FIG. 7 is designated by the number 191. The side members 110 and 114 (only side member 114 shown in FIG. 7 are each mounted on the platform 52 by the mounting rods 142, 144, 146 and 148 (only mounting rods 146 and 148 shown in FIG. 7) as previously discussed. The portion between the ends of the mounting rods 142, 144, 146 and 148 pass through a support plate 193 (only portion of mounting rods 146 and 148 are shown passing through the support plate 193 in FIG. 7). One end of a shaft 192 is mounted to the lower surface of the members 110 and 114 (only member 114 shown in FIG. 7) as previously discussed with the other end freely passing through hole 194 in the support plate 193 and having a washer and nut combination 196 mounted thereon. One or more elevator mechanisms 198 (only one shown in FIG. 7) has one end connected to the lower surface of the supporting plate 140 and the other end connected to the upper surface of the mounting platform 52 as viewed in FIG. 7. Activating the elevator mechanism 198 moves the support plate 193 downward as viewed in FIG. 7. As the support plate 193 slides along the mounting rods, it moves into engagement with the nut and washer arrangement 196 to move the center portion of the side members 110 and 114 (only side member 114 shown in FIG. 7) downward to deflect the side members 110 and 114 as shown in FIG. 6. Moving the elevator mechanism 198 in the opposite direction moves the support plate 193 upward as viewed in FIG. 7, out of contact with the washer and nut arrangement 196 allowing the members 110 and 114 to move into the initial position. The nut and washer arrangement 196 can be used to change the deflection of its respective member 110, 114. For example, for the same displacement of the support plate 193, positioning the nut and washer arrangement closer to its respective member 110, 114, increases the deflection of its respective member 110, 114 and vice versa. A mold having the deflection arrangement shown in FIG. 7 was used.

Figure 8:
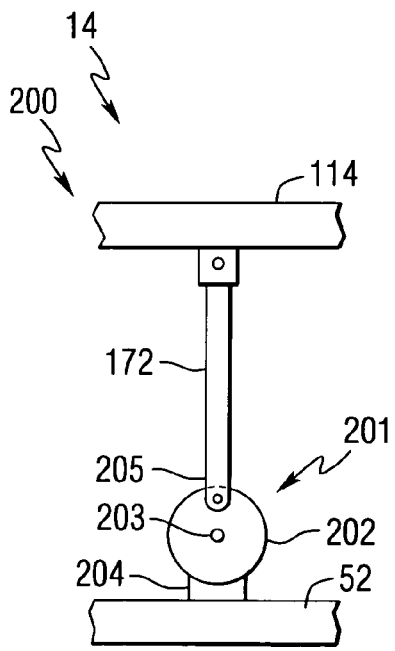
FIG. 8 is a view similar to the view of FIG. 7 illustrating another non-limiting embodiment of the invention to deflect the side members of the flexible surface mold.

With reference to FIG. 8 there is shown another non-limiting embodiment of a system to move or flex the members 110 and 114. The non-limiting embodiment of the flexible surface mold 14 of the invention shown in FIG. 8 is designated by number 200. The elevator mechanism 201 of the flexible mold 200 includes a circular plate 202 mounted on shaft 203 of motor 204. End 205 of the pull rod 172 is pivotally mounted to a marginal edge portion of the circular plate 202 to provide a crank mechanism. With the flexible mold 200 in the initial position, e.g. the members 102–105, 110 and 114 in a horizontal plane as shown in FIG. 3, the pull shaft 172 connected to the circular plate 202 is in the 12 o'clock position as viewed in FIG. 8. As the circular plate 202 rotates clockwise or counterclockwise, the pull rod 172 is displaced downward to move or flex the members 110 and 114 (only member 114 shown in FIG. 8) from the first position to the second position. After the glass sheet is transferred to the upper mold 28 of FIG. 1 or 80 of FIG. 2, the circular plate 202 is rotated clockwise or counterclockwise to displace the pull rod 172 upward as viewed in FIG. 8 to position the members 110 and 114 in the initial position.

Figure 9:
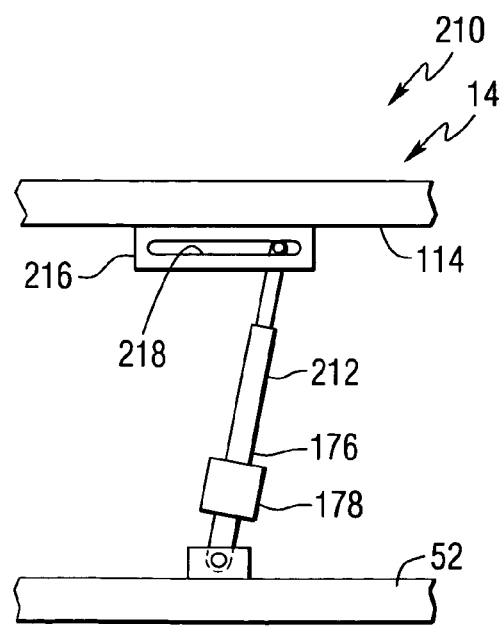
FIG. 9 is a view similar to the view of FIG. 7 illustrating still another non-limiting embodiment of the invention to deflect the side members of the flexible surface mold.

With reference to FIG. 9, there is shown still another non-limiting embodiment of the flexible surface mold 14. In FIG. 7, the non-limiting embodiment of the full flexible surface mold 14 of the invention is designated by the number 210. The mold 210 is similar to the mold 100 shown in FIG. 3 except that the pull rod 172 of the mold 100 is replaced with a telescoping pull rod 212. A telescoping pull rod 212 is connected to the side members 110 and 114 (only side member 114 shown in FIG. 9) by way of a slotted plate 216 mounted to the lower surface of the side members 110 and 114. Positioning the end of the telescoping pull rod 212 of each of the side members 110 and 114 in the center of the slot 218 of the plate 216 deflects the side members 110 and 114 equally on each side of the pull rod. Mounting the end of telescoping pull rod 212 of each of the side members 110 and 114 to the left side of the slot 218 as viewed in FIG. 9, deflects the left side of the side members 110 and 114 more that the right side of the side members as viewed in FIG. 9. Connecting each of the telescoping pull rod 212 for each of the side members 110 and 114 to the right side of the slot 218 of the plate 216 as viewed in FIG. 9, deflects the right side of the side members 110 and 114 more than the left side of the side members 110 and 114. As can be appreciated, the telescoping pull rod 212 does not have to be at the same position in its respective slot for each of the side members, e.g. the pull rod 212 can be in the right portion of the slot 218 of the plate 216 attached to the side member 110, and the pull rod 212 can be in the left portion of the slot 218 of the plate 216 attached to the side member 114, as viewed in FIG. 9 for twisted complex shapes.

As can be appreciated, the elevator mechanism for deflecting the side member 110 and 114 can be any of the types known in the art, for example, but not limited to, an air cylinder, a servomotor, a stepper motor, a rack and pinion arrangement and/or a crank mechanism.

Referring now to FIGS. 3 and 5, a plurality of donut rolls 230 are driven by shaft 232; a plurality of donut rolls 234 are driven by shaft 236, and a plurality of donut rolls 238 are driven by shaft 240. Ones of the donuts 230, 234 and 238 are mounted between adjacent members 102–105; a donut roll 230, 234 and 238 is on the outer side of the member 102 and the outer side of the member 105 as shown in FIG. 3. The shafts 232, 236 and 240 are mounted below the members 102–105 as viewed in FIGS. 3 and 5. With reference to FIG. 5, one end of the shafts 232, 236 and 240 are connected to a conventional powering arrangement 242 to rotate the shafts and donut rolls and the other end of the shafts mounted in bearing block 243 (only bearing block 243 for the shaft 232 are shown in FIG. 5).

As can be appreciated, the invention is not limited to the type of rolls and shafts used or the mounting of the rolls on the shaft. The combination of donut rolls and shaft can be of the type known for use in the art, e.g. as shown and discussed in U.S. Pat. No. 3,527,589, which patent is hereby incorporated by reference and can be arranged in sections with their rotational speed electronically adjusted in a manner well know in the art so that the speed of each shaft can be controlled and synchronized. For example, but not limiting to the invention, the rolls can be secured to the shaft by a friction fit between the roll and the shaft; the donut rolls can be secured on the shaft by fasteners, e.g. a screw passing through the collar of the donut roll into engagement with the shaft, or the shaft and rolls may be unitary segments secured together to give a desired conveyor roll length. Further, the shafts can be individually driven or driven by one power source, e.g. a motor and belt arrangement of the type used in the art.

The periphery of the donut rolls 230, 234 and 238 are above upper surface 244 of the members 102–105 when the flexible mold 14 is in the first or sheet receiving position. The heat softened sheet 24 (see FIGS. 1 and 2) moves from the exit end of the furnace 22 onto the donut rolls 230, 234 and 238 and the donut rolls move the sheet over the members 102–105 of the flexible mold 14 to a desired position below the shaping surface 28 (FIG. 1) or 80 (FIG. 2). As the sheet 24 nears the position (the shafts continue to rotate), or is in the position (the rotation of the shafts is stopped), below the upper mold, the elevator arrangement or mechanism 54 is energized to move the platform 52 and the flexible surface mold upward toward the shaping mold 28 or 80. As the flexible surface mold moves upward, the members 102–105 engage and raise the sheet above the rolls 230, 234 and 238. The stepper motor 178 is energized to lower the pull rod 172 as the platform 52 moves upward toward the shaping surface of the upper mold or the elevator mechanism is energized after the glass sheet contacts the shaping surface of the upper mold. The members 102–105 of the flexible mold bias the sheet against the shaping surface of the upper mold. Vacuum is pulled through the shaping surface of the upper mold to bias the sheet against the shaping surface of the upper mold. The elevator mechanism 54 lowers the platform 52 and the upper mold moves to the transfer station as previously discussed. The stepper motor 178 moves the pull rod upward to move the members 102–105 into the sheet receiving position as the elevator mechanism 54 lowers the platform into the sheet receiving position with the surface of the members 102–105 below the peripheral surface of the donut rolls 230, 234 and 238. The flexible surface mold is now ready to receive the next sheet. Preferably in the practice of the invention, the periphery of the donut rolls is covered to prevent marring of the glass sheet surface, e.g. covered with an aramid cloth.

Figure 10:
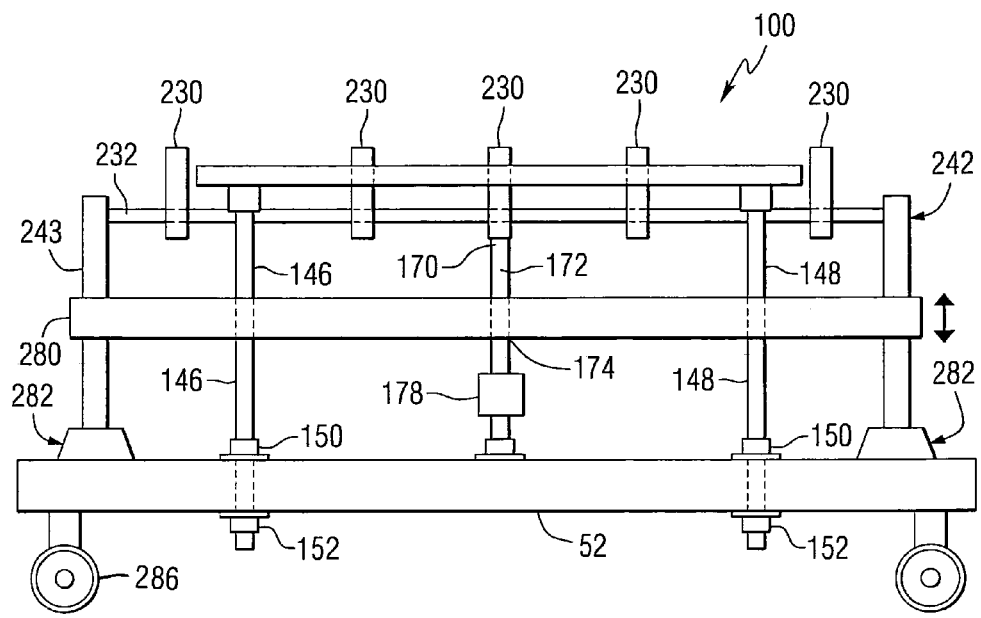
FIG. 10 is a view similar to the view of FIG. 5 showing another non-limiting embodiment of the flexible mold of the invention.

With reference to FIG. 10, there is shown another non-limiting embodiment of the invention. In the non-limiting embodiment of FIG. 10, a support table 280 is mounted above the platform 52 on spaced elevator mechanisms 282, e.g. an elevator adjacent each corner of the table 280 (only two elevator mechanisms 282 shown in FIG. 10) to raise and lower the table. The portion of the mounting rods 142, 144, 146 and 148 (only mounting rods 146 and 148 shown in FIG. 10) between their respective ends and portion of the pull rod 172 between its ends freely pass through holes (not shown) in the table 280. The powering arrangement 242 for rotating the shafts 232, 236 and 240, and the bearing blocks 243 are mounted on the table 280. With this arrangement, as the elevator mechanisms 282 move the table upward as viewed in FIG. 10, the rolls move above the surface of the members 102–105 of the flexible mold 100, and as the elevator mechanisms 282 moves the table 280 downward as viewed in FIG. 10, the periphery of the rolls drop below the surface of the members 102–105 of the flexible mold 100.

As can be appreciated, the invention is not limited to the mechanical arrangement to raise and lower, and to power the shafts 232, 236 and/or 240. For example, but not limiting to the invention, the shafts can be connected to a system to power the shafts and to a separate system to raise and lower the shafts. Further, the shafts 232, 236 and 240 can be continuously driven as discussed above or can be powered on when the sheet is moved over the members 102–105, 110 and/or 112 and powered off when the sheet is in position for shaping. Further, shafts supports and bearings can be used between the ends of the shafts to prevent bowing of the shafts 232, 236 and/or 240 due to the weight of the sheet and/or the length of the shaft. Although the rotational speed of the donut rolls 230, 234 and 238 is not limiting to the invention, it is preferred that the speed be coordinated with the conveying rolls 42 of the furnace 22 to prevent marring or scuffing of the glass sheet surface or misalignment of the glass sheet surface as it move from the exit end of the furnace onto the donut rolls of the mold 14.

Although not limiting to the invention, for ease of moving the flexible mold and associated equipment, e.g. rolls, shafts and powering arrangement into and out of the shaping station for maintenance and repair, wheels 286 may be mounted on the under surface of the platform 52, e.g. as shown in FIG. 10. Further, the elevator mechanism 54 to lift and lower the platform 52 may be mounted in or on the floor at the shaping station, e.g. as shown in FIG. 1, or as shown in FIG. 5, mounted on a cart 290 having an elevator arrangement 292 for raising and lowering the platform 52 having the flexible surface mold and associated equipment. Still further, the invention contemplates securely mounting the platform 52 having the flexible mold and associated equipment on the elevator mechanism 54 mounted on or in the shaping station.

The invention is not limited to the material of the members 102–105, 110 and 114; however, as can be appreciated by those skilled in the art, the material should be capable of withstanding the temperature in which they are used e.g. at a temperature of 1100 to 1200° F. (593 to 649° C.). Further the material should have minimum elongations so that the members do not elongate, resulting in applying insufficient pressure to bias the heat softened sheet against the shaping surface. Still further the material should not mar the surface of the sheet being shaped. In the one non-limiting practice of the invention, the members 102–105 are made of a spring steel substrate having a covering of 1/8 inch (0.32) centimeter (cm)) thick Spauldite® ARK-2 aramid laminate available from Spaulding Fibre Company, Inc, New York. With reference to FIG. 6A, a layer 293 of the aramid laminate can be mounted on or a sleeve of the material over the substrate 295, e.g. a spring steel substrate and secured in position in any convenient manner, e.g. by a nut and bolt assembly, or glue. In the practice of the invention, an RTV high temperature silicone adhesive is used to glue the aramid laminate to the surface of the steel substrate. Other materials that can be used in the practice of the invention include felt insulating pad layer may be used to cover the surface of the members 102–105. In one non-limiting embodiment of the invention, the members 110 and 114 were made of titanium and the members 102–104 were made of spring steel.

The characteristics or parameters of the flexible surface mold 14 of the invention that should be considered in its construction are the flexibility of the sheet; the width, length and thickness of the members 102–105, 110 and 114; the % elongation of the members 102–105, 110 and 114; the % elongation of the springs, and the flexibility of the members 102–105, 110 and 114. In the following discussion, reference is made to the members 102–105, however, as will be appreciated the invention is not limited to the number of elongated members between the side members 110 and 114.

The selection of 4 elongated members 102–105 was a selection made for ease of discussing the invention and not to limit the invention.

As the flexibility of the sheet increases, while keeping all the other parameters constant, less force is required to bias or urge the sheet against the shaping surface of the upper mold 28 (FIG. 1) or 80 (FIG. 2) and vice versa. As the width of the members 102–105 increases, while keeping all the other parameters constant, the number of the members 102–105 supporting the glass sheet will decrease and the force required to biases the sheet against the shaping surface of the upper mold increases and vice versa. As can be appreciated as the width of the members 102–105 decreases, the force per area of the members 102–105 increases and may form depressions in the sheet as it is biased against the shaping surface of the upper mold.

A flexible mold was made having 7 elongated members 102–105 were made of spring steel. Five (5) of the members that made up the center portion of the flexible mold each had a width of 2 inches (5.08 centimeters ("cm")). A member having a width of 3 inches (7.62 cm) was mounted on each outer side of the center portion with the members spaced 1 inch (2.54 cm) from one another. The members 110 and 114 had a length of 24 inches (6 meters) and a width of 2 inches (5.08 cm). The members each had a thickness of 0.25 inch (0.64 cm).

As the length of the members 102–105 increases while keeping the other parameters constant, the force required to bias the sheet against the shaping surface of the upper mold increases and vice versa. As can be appreciated, the length of the members 102–105 should be such that the springs 116 are outside the perimeter of the shaping surface when the members 102–105 bias the sheet against the shaping surface of the upper mold. As the thickness of the members 102–105 increases, while keeping the other parameters constant, the force required to conform the shape of the members 102–105 to the shape of the shaping surface of the upper mold increases and vice versa. As the width of the members 110 and 114 increases, while keeping all the other parameters constant, the force required to bend or deflect the members 110 and 114 increases and vice versa. As the length of the members 110 and 114 increases while keeping the other parameters constant, the force required to deflect the members 110 and 114 increases and vice versa. As the thickness of the members 110 and 114 increases, while keeping the other parameters constant, the force required to deflect the members 110 and 114 increases and vice versa. As can be appreciated, the length, width and thickness of the members 110 and 114 should be sufficient to prevent bowing of the members 110 and 114 by the members 102–105 as the members 102–105 bias the sheet against the shaping surface of the upper mold.

In the practice of the invention, the members 102–105, 110 and 114 have a length sufficient to use the flexible surface mold with some or all the upper mold in inventory. In one non-limiting embodiment springs 116 used in the practice of the invention were compression springs to take up expansion of steel under heat. Although not required in the practice of the invention, it is preferred to have the spring spaced from the heated sheet. Springs used in the practice of the invention were purchased from Lee Spring Co. of Brooklyn, N.Y.

As the % elongation of the members 102–105, 110 and 114 increases while the remaining parameters remain constant, less force is applied to sheet during shaping of the sheet and vice versa. As the % elongation of the springs 116 increase while keeping the remaining parameters constant, the force applied to the sheet decreases and vice versa. As the flexibility of the members 102–105 increase less force is required to conform the members 102–105 to the shape of the shaping surface of the upper mold and vice versa. As the deflection of the members 110 and 114 increases while the remaining parameters are kept constant, less force is required to deflect the members 110 and 114 and vice versa. As the distance between the members 102–105 decrease, more of the sheet surface is engaged, however the spacing between the members should be sufficient to accommodate the donut rolls.

The width of the donut rolls is not limiting to the invention, however, the thinner the rolls, the smaller the space between the members 102–105. In selecting the width of the rolls, care has to be exercised not to make the rolls to thin. More particularly, if the width is too small, the glass will be supported on a "knife-edge" or make "point contact", which will mar the sheet surface. Although not required, donut rolls having a width in the range of ½ to 1 inch (1.27 to 2.54 cm) can be used. In the practice of the invention, donut rolls having a width of ¾ inch (1.91 cm) were used. As can be appreciated, the invention is not limited to the number or rows of donut rolls used to support the glass sheet. However, as the softness of the sheet 24 increases, the rows of donut rolls should increase to prevent sagging of the sheet.

With reference to FIGS. 1, 2, 3, 5 and 6 as required, a series of glass sheets 24 moves through the furnace 22. As the leading sheet 24 of the series moves from furnace toward the shaping station 26 (FIG. 1) or 74 (FIG. 2), the sensor 66 detects its movement and the flexible surface shaping mold 44 (FIGS. 1 and 2), 100 (FIGS. 3, 6 and 10) in the shaping station 26 or 76 is in the first position or sheet receiving position to receive the sheet 24 exiting from the furnace 22. The periphery of the donut rolls 230, 234 and 238 (FIGS. 3 and 10) are above the upper surface of the flexible mold, and rotating at a speed similar to the rotational speed of the rolls 42 of the furnace 22 to move the sheet 24 from the exit end of the furnace 22 over the members 102–105 of the flexible mold. As the sheet moves to a position below the shaping surface 36 of the upper mold 28 (FIG. 1) or the shaping surface of the mold 80 (FIG. 2), the elevator arrangement 54 (see FIG. 1) is energized to move the platform 52 upward to move the members 102–105 into engagement with the sheet to raise the sheet above the periphery of the rotating donut rolls and to support the sheet on the surface of the members 102–105.

The elevator arrangement 54 continues to move the mold 14 (FIGS. 1 and 2), 100 (FIGS. 3 and 10) upward toward the shaping surface 36 of the upper mold 28 (FIG. 1) or shaping surface of the upper mold 80 (FIG. 2). When the sheet makes initial contact with the shaping surface of the upper mold, the stepping motor is energized to displace the pull rod 172 downward as viewed in FIGS. 3 and 10 to deflect the members 110 and 114 (see FIG. 6). The flexible mold 100 continues to move upward biasing the sheet 24 against the shaping surface of the upper mold 28 or 80. The springs 116 allow for the members 102–105 to reorient and conform to the shaping surface of the upper mold by urging substantially the entire major surface of the sheet against the shaping surface of the upper mold. After the sheet is biased against the shaping surface, vacuum is pulled through the evacuation pipe 50 for the upper mold 28 of FIG. 1 or evacuation pipe 82 for the upper mold 80 of FIG. 2 to further conform the sheet to the shaping surface and to hold the sheet against the shaping surface. The elevator arrangement 54 lowers the flexible mold 14 as viewed in FIG. 1, the flexible mold 100 as viewed in FIG. 5. As the flexible mold is lowered and clears the upper mold, the upper mold moves to the right as viewed in FIGS. 1 and 2 to drop the shaped sheet on the rolls 34 (FIG. 1) or transfer ring 88 (FIG. 2). Thereafter the upper mold moves back to the sheet receiving position in the shaping station and the shaped sheet moves into the cooling station 40 (FIG. 1) or 72 (FIG. 2).

During the movement of the upper shaping mold from and to the shaping station, the mold 14, and 100 is displaced away from the upper mold toward the sheet receiving position. With reference to FIG. 5, as the mold 14, 100 moves toward the sheet receiving position, the stepping motor is activated to raise the pull rod 172 to raise the side members 110 and 114 (only side member 114 shown in FIG. 10) to their sheet receiving position with the periphery of the rotating donut rolls 230, 234 and 238 above the surface of the members 102–105 and the springs 116. The flexible mold 14, 100 is now in position to receive the next sheet 24 from the furnace 22.

In the practice of the invention, the elevator arrangements or mechanisms discussed to deflect the members 110 and 114 can be used to raise and lower the mold 14 and/or the donut rolls. Further, the elevator arrangements or mechanisms discussed to deflect the members 110 and 114, e.g. the cam arrangement shown in FIG. 6, can be used with the telescoping rod of FIG. 7. Still further, the invention contemplates deflecting the members 110 and 114 in the same direction for the same distance and deflecting one member 110 or 114 a different distance than the other member 114 or 110, respectively and through different arcs, e.g. as discussed for FIG. 7. The non-limiting embodiments of the flexible mold 14 were discussed to shape a glass sheet using on the shaping shown in FIGS. 1 and 2, however the invention is not limited thereto and may be used with any equipment or process to heat a glass sheet shape a glass sheet and/or heat treat a glass sheet.

Figure 11:
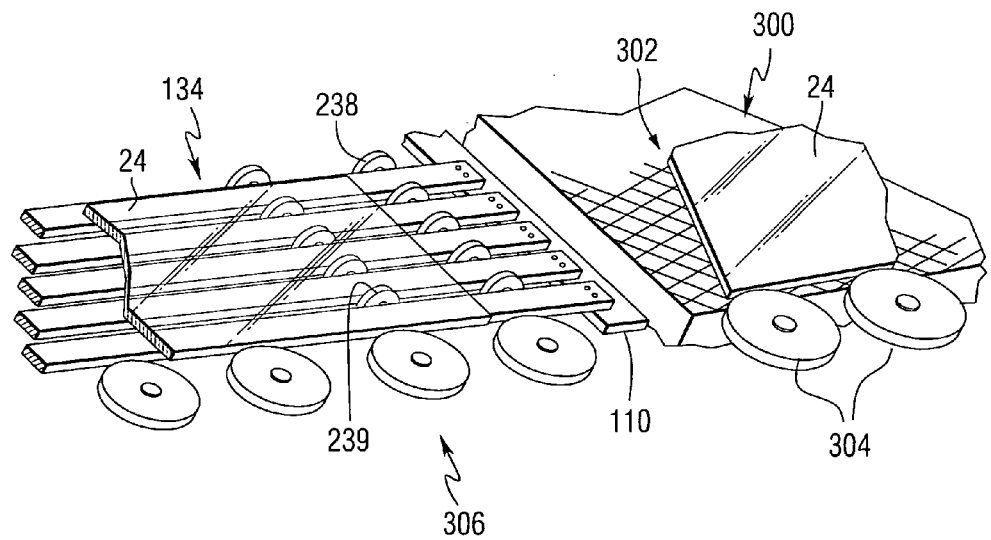
FIG. 11 is a prospective view looking downstream at a glass sheet heating and shaping arrangement showing only a fragmented view of a gas hearth heating furnace and a fragmented view of a non-limiting embodiment of the flexible surface mold of the invention.

The glass sheet can be heated in any manner, e.g. using a gas fired or electric heated tunnel furnace of the type used in the art. With reference to FIG. 11 there is shown the flexible surface mold 134 of FIG. 4 used with a gas hearth heating furnace 300, partially shown in FIG. 11 in which the glass sheets 24 are convened on a bed 302 of heated air. The bed 302 is titled about 7° off the horizontal and the glass sheets 24 moving on the heated air are also tilted about 7° off the horizontal and held on the bed and advanced by conveyor wheels 304. The heated glass 24 is moved onto the flexible mold 134 by the donut rolls (only donut rolls 238 and 239 shown in FIG. 11). The flexible mold is about 7° off the horizontal, and the sheet 24 is maintained on the members of the flexible mold by the conveying wheels 306. As the sheet moves into position below a shaping surface, e.g. of upper shaping molds as discussed above, the elevator mechanisms are operated to raise the flexible mold 134 and flex the members 110 and 114 (only member 110 shown in FIG. 11) to move the sheet against a shaping surface as discussed above. After the sheet is shaped, the transfer of the sheet and subsequent cooling of the glass sheet can be accomplished in any usual manner, e.g. as discussed above.

As can be appreciated, the particular embodiments described in detail herein are illustrative only and are not limiting to the scope of the invention, which is to be given the full breadth of the appended claims and any and all equivalents thereof.

What is claimed is:

1. A flexible biasing surface mold comprising:
   a platform having a major surface;
   a first deformable member mounted on the platform and spaced from the major surface of the platform;
   a second deformable member mounted on the platform and spaced from the major surface of the platform and from the first deformable member;
   a plurality of flexible strap members between the first and second deformable members and having a space between adjacent strap members, each strap member having one end portion connected to the first deformable member, the opposite end portion connected to the second deformable member, and a surface facing and spaced from the major surface of the platform wherein the strap members are connected to the platform solely by their connections to the first and second deformable members, and
   a force applying member acting on at least one of the deformable members to change distance between the major surface of the platform and a portion of the at least one of the deformable member.

2. The mold according to claim 1 further comprising:
   a first pair of elongated rigid members each having an end portion mounted to the first deformable member and the opposite end portion mounted on the platform to position the first deformable member in a spaced relationship to the major surface of the platform, wherein the first pair of rigid members are spaced from one another, and
   a second pair of elongated rigid members each having an end portion mounted to the second deformable member and the opposite end portion mounted on the platform to position the second deformable member in a spaced relationship to the major surface of the platform, wherein the second pair of rigid members are spaced from one another.

3. The mold according to claim 2 wherein the force applying member is a first force applying member connected to the first deformable member at a location between the first pair of rigid members, and further comprising a second force applying member connected to the second deformable member at a location between the second pair of rigid members to change the distance between the second deformable member and the major surface of the platform.

4. The mold according to claim 3 wherein the first and second deformable members each having first surface facing the major surface of the platform and an opposite surface defined as a second surface, and the first end portion of each of the first pair of rigid members is pivotally mounted to the first surface of the first deformable member, and the first end portion of each of the second pair of rigid members is pivotally mounted to the first surface of the second deformable member.

5. The mold according to claim 2 wherein the force applying member comprises:
   a support member mounted between the platform and the first and second deformable members;
   a first pull rod having an end portion connected to the first deformable member at a location between the first pair of rigid members and the other end defined as a second end portion of the first pull rod connected to the support member;
   a second pull rod having an end portion connected to the second deformable member at a location between the second pair of rigid members and the other end defined as a second end portion of the second pull rod connected to the support member, and
   an elevator to move the support member toward the major surface of the platform to deflect the first and second deformable members.

6. The mold according to claim 5 wherein the first and second pull rods are slideably mounted in the support member, and the support member is captured between the first deformable member and the second end portion of the first pull rod, and the second deformable member and second end portion of the pull rod.

7. The mold according to claim 3 wherein the surface of each of the strap members is a first surface facing the major surface of the platform and each of the strap members have an opposite surface defined as a second surface and further comprising:
   at least one wheel in the space between adjacent strap members;
   a shaft interconnecting the wheels with the shaft between the first surface of the strap members and the major surface of the platform, and
   a displacement system to move the wheels and strap members relative to one another from a first position with portions of periphery of the wheels above the second surface of the strap members to a second position with the periphery of the wheels below the second surface of the strap members.

8. The mold according to claim 7 wherein the shaft and the wheels comprise a first conveying roll, and the first conveying roll is one of a plurality of spaced conveying rolls wherein each of the conveying rolls includes a wheel in the space between adjacent strap members and a wheel on outer side of the outer strap members, and further comprising a motor operatively connected to the plurality of shafts wherein when the motor is energized the shafts and their respective wheels are rotated.

9. The mold according to claim 8 wherein the displacement system moves the platform to move the strap members from the first position to the second position.

10. The mold according to claim 9 wherein the shafts of the plurality of conveying rolls are mounted on a support structure and the platform is mounted for movement toward and away from the plurality of conveying rolls.

11. The mold according to claim 8 wherein the displacement system comprises a support member between the strap members and the platform and at least one displacement device to move the support member and the shafts of the plurality of conveyor rolls toward and away from the strap members.

12. The mold according to claim 11 wherein the support member has a first surface facing the platform and the at least one displacement device is mounted to the platform and to the first surface of the support member wherein the at least one displacement device moves the support member toward and away from the strap members to move the wheels and strap members from the first position to the second position, and the force applying members moves their respective deformable member toward the major surface of the platform.

13. The mold according to claim 6 wherein at least one of the conveying rolls includes a unitary portion of shafts and wheels.

14. The mold according to claim 1 wherein the first and second deformable members are elongated members having a flat major surface and a long axis with the long axis of the first and second deformable members parallel to one another and the plurality of flexible strap members are at least three flexible strap members and each of the strap members is an elongated member having a flat major surface opposite the surface facing the platform and a long axis with the long axes of the strap members parallel to one another and normal to the long axis of the first deformable member.

15. The mold according to claim 14 wherein at least one of the strap members is a laminate comprising a spring steel substrate having a plastic covering over at least the flat major surface of the at least one strap member.

16. The mold according to claim 3 wherein the first and second force applying members each comprise:
   a biasing device mounted on the major surface of the platform, and
   a rod having first end portion connected to the biasing device and an opposite end portion defined as a second end portion wherein the second end portion of the rod of the first applying member is connected to the first deformable member and the second end of the rod of the second applying member connected to the second deformable member.

17. The mold according to claim 16 wherein the biasing device is selected from the group of electrically powered motors, stepper motors, servomotors, fluid operated cylinders, rack and pinion arrangements and crank mechanisms.

18. The mold according to claim 16 wherein the rod of the first and second applying member is a telescoping rod and further comprising a first plate having a slot mounted on the first surface of the first deformable member between the first pair of rigid members, and a second plate having a slot mounted on the first surface of the second deformable member and the second end portion of the rod of the first force applying member mounted in the slot of the first plate and the second end portion of the rod of the second force applying member mounted in the slot of the second plate.

19. The mold according to claim 1 wherein the strap members are each elongated members having a flat major surface facing away from the major surface of the platform and are each a laminate including a spring steel substrate having a high temperature plastic secured to the flat major surface.

20. The mold according to claim 19 wherein the strap members are connected to the first deformable member by a pair of springs and the opposite end of the strap members are connected to the second bendable member by a pair of springs.

21. The mold according to claim 19 wherein the ends of the support members are connected to the first bendable member and the second bendable member by nut and bolt assemblies.

22. In a sheet shaping apparatus of the type having a shaping station comprising an upper mold, a lower mold and an elevator arrangement to move the upper mold and the lower mold toward and away from one another, the upper mold comprising a downwardly facing shaped surface, wherein the improvement comprises:
   the lower mold comprising:
      a platform having a major surface;
      a first deformable member mounted on the platform and spaced from the major surface of the platform;
      a second deformable member mounted on the platform and spaced from the major surface of the platform and from the first deformable member;
      a plurality of flexible strap members between the first and second deformable members and having a space between adjacent strap members, each strap member having one end portion connected to the first deformable member, the opposite end portion connected to the second deformable member, and a surface facing and spaced from the major surface of the platform wherein the strap members are connected to the platform solely by their connections to the first and second deformable members, and
   a force applying member acting on at least one of the deformable members to change distance between the major surface of the platform and a portion of the at least one of the deformable member.

23. The sheet shaping apparatus according to claim 22 further comprising a heating furnace having a conveyor on one side of the shaping station defined as the upstream side of the shaping station and a cooling furnace having sheet conveying system on the other side of the shaping station defined as the downstream side of the shaping station and a transfer station between the shaping station and the cooling furnace.

24. The sheet shaping apparatus according to claim 23 wherein the lower mold further comprises:
   a first pair of elongated rigid members each having an end portion mounted to the first deformable member and the opposite end portion mounted on the platform to position the first deformable member in a spaced relationship to the major surface of the platform, wherein the first pair of rigid members are spaced from one another, and
   a second pair of elongated rigid members each having an end portion mounted to the second deformable member and the opposite end portion mounted on the platform to position the second deformable member in a spaced relationship to the major surface of the platform, wherein the second pair of rigid members are spaced from one another.

25. The lower mold of the sheet shaping apparatus according to claim 24 wherein the force applying member is a first force applying member connected to the first deformable member at a location between the first pair of rigid members, and further comprising a second force applying member connected to the second deformable member at a location between the second pair of rigid members to change the distance between the second deformable member and the major surface of the platform.

26. The lower shaping mold of the sheet shaping apparatus according to claim 25 wherein the first and second deformable members each having first surface facing the major surface of the platform and an opposite surface defined as a second surface, and the first end portion of each of the first pair of rigid members is pivotally mounted to the first surface of the first deformable member, and the first end portion of each of the second pair of rigid members is pivotally mounted to the first surface of the second deformable member.

27. The lower shaping mold of the sheet shaping apparatus according to claim 24 wherein the force applying member comprises:
   a support member mounted between the platform and the first and second deformable members;
   a first pull rod having an end portion connected to the first deformable member at a location between the first pair of rigid members and the other end defined as a second end portion of the first pull rod connected to the support member;
   a second pull rod having an end portion connected to the second deformable member at a location between the second pair of rigid members and the other end defined as a second end portion of the second pull rod connected to the support member, and an elevator mounted on the platform to move the support member toward the major surface of the platform to deflect the first and second deformable members.

28. The lower shaping mold of the shaping apparatus according to claim 27 wherein the first and second pull rods are slideably mounted in the support member, and the support member is captured between the first deformable member and the second end portion of the first pull rod, and the second deformable member and the second end portion of the pull rod.

29. The lower shaping mold of the sheet shaping apparatus according to claim 25 wherein the surface of each of the strap members is a first surface facing the major surface of the platform and each of the strap members have an opposite surface defined as a second surface and further comprising:
at least one wheel in the space between adjacent strap members;
a shaft interconnecting the wheels with the shaft between the first surface of the strap members and the major surface of the platform, and
a displacement system to move the wheels and strap members relative to one another from a first position with portions of periphery of the wheels above the second surface of the strap members to a second position with the periphery of the wheels below the second surface of the strap members.

30. The lower shaping mold of the sheet shaping apparatus according to claim 29 wherein the shaft and the wheels comprise a first conveying roll, and the first conveying roll is one of a plurality of spaced conveying rolls wherein each of the conveying rolls includes a wheel in the space between adjacent strap members and a wheel on outer side of the outer strap members, and further comprising a motor operatively connected to the plurality of shafts wherein when the motor is energized the shafts and their respective wheels are rotated.

31. The lower shaping mold of the shaping apparatus according to claim 30 wherein the displacement system moves the platform to move the strap members from the first position to the second position.

32. The lower shaping mold of the shaping apparatus according to claim 31 wherein the shafts of the plurality of conveying rolls are mounted on a support structure and the platform is mounted for movement toward and away from the plurality of conveying rolls.

33. The lower shaping mold of the shaping apparatus according to claim 30 wherein the displacement system comprises a support member between the strap members and the platform and at least one displacement device to move the support member and the shafts of the plurality of conveyor rolls toward and away from the strap members.

34. The lower shaping mold of the shaping apparatus according to claim 33 wherein the support member has a first surface facing the platform and the at least one displacement device is mounted to the platform and to the first surface of the support member wherein the at least one displacement device moves the support member toward and away from the strap members to move the wheels and strap members from the first position to the second position, and the force applying members moves their respective deformable member toward the major surface of the platform.

35. The lower shaping mold of the shaping apparatus according to claim 28 wherein at least one of the conveying rolls includes a unitary portion of shafts and wheels.

36. The lower shaping mold of the shaping apparatus according to claim 22 wherein the first and second deformable members are elongated members having a flat major surface and a long axis with the long axis of the first and second deformable members parallel to one another and the plurality of flexible strap members are at least three strap members and each of the strap members is an elongated member having a flat major surface facing away from the platform and a long axis with the long axes of the strap members parallel to one another and normal to the long axis of the first deformable member.

37. The lower shaping mold of the shaping apparatus according to claim 36 wherein at least one of the strap members is a laminate comprising a spring steel substrate having a plastic covering over at least the flat major surface of the at least one strap member.

38. The lower shaping mold of the shaping apparatus according to claim 25 wherein the first and second force applying members each comprise:
a biasing device mounted on the major surface of the platform, and
a rod having first end portion connected to the biasing device and an opposite end portion defined as a second end portion wherein the second end portion of the rod of the first applying member is connected to the first deformable member and the second end of the rod of the second applying member connected to the second deformable member.

39. The lower shaping mold of the shaping apparatus according to claim 38 wherein the biasing device is selected from the group of electrically powered motors, stepper motors, servomotors, fluid operated cylinders, rack and pinion arrangements and crank mechanisms.

40. The lower shaping mold of the shaping apparatus according to claim 38 wherein the rod of the first and second applying member is a telescoping rod and further comprising a first plate having a slot mounted on the first surface of the first deformable member between the first pair of rigid members, and a second plate having a slot mounted on the first surface of the second deformable member and the second end portion of the rod of the first force applying member mounted in the slot of the first plate and the second end portion of the rod of the second force applying member mounted in the slot of the second plate.

41. The lower shaping mold of the shaping apparatus according to claim 22 wherein the strap members are each elongated members having a flat major surface facing away from the major surface of the platform and are each a laminate including a spring steel substrate having a high temperature plastic secured to the flat major surface.

42. The lower shaping mold of the shaping apparatus according to claim 41 wherein the strap members are connected to the first deformable member by a pair of springs and the opposite end of the strap members are connected to the second bendable member by a pair of springs.

43. The lower shaping mold of the shaping apparatus according to claim 41 wherein the ends of the support members are connected to the first bendable member and the second bendable member by nut and bolt assemblies.

44. The sheet shaping apparatus claim 23 wherein the heating furnace comprises a gas hearth heating furnace, the plurality of flexible strap members lie in a plane having a slope toward conveying wheels mounted at one side of one of the outer strap members of the plurality strap members.

45. The lower shaping mold of the shaping apparatus according to claim 22 wherein the platform has wheels to move the lower mold into and out of the shaping station.

46. The lower shaping mold of the shaping apparatus according to claim 32 wherein the displacement system is mounted at the shaping station and the platform and the plurality of spaced conveyor rolls are mounted on a transportation device to move the platform and the plurality of spaced conveyor rolls into the shaping station to position the platform over the displacement system and to move the platform and the plurality of conveyor rolls out of the shaping station.

47. The lower shaping mold of the shaping apparatus according to claim 32 wherein the platform, the plurality of spaced conveyor rolls and the displacement system are mounted on transportation device to move the platform, the plurality of spaced conveyor rolls and the displacement system into and out of the shaping station.

\* \* \* \* \*